United States Patent
Nagahashi

[11] Patent Number: 6,020,666
[45] Date of Patent: Feb. 1, 2000

[54] TWO-POLE MOTOR

[75] Inventor: Akira Nagahashi, Osaka, Japan

[73] Assignee: Seibunsya Co., Ltd., Osaka, Japan

[21] Appl. No.: 09/298,858

[22] Filed: Apr. 26, 1999

[51] Int. Cl.⁷ .................................................. H02K 21/26
[52] U.S. Cl. .......................................... 310/154; 310/254
[58] Field of Search .................................... 310/136, 152, 310/154, 148, 254, 48, 261

[56] References Cited

U.S. PATENT DOCUMENTS

| | | | |
|---|---|---|---|
| 4,217,508 | 8/1980 | Uzuka | 310/46 |
| 4,237,397 | 12/1980 | Mohr et al. | 310/154 |
| 4,438,362 | 3/1984 | Brown | 310/152 |
| 4,460,839 | 7/1984 | Jaffe | 310/154 |
| 4,467,232 | 8/1984 | Eichhorn et al. | 310/154 |
| 4,536,669 | 8/1985 | Morishita | 310/241 |
| 4,845,398 | 7/1989 | Cesare | 310/261 |
| 5,008,578 | 4/1991 | Pace | 310/256 |
| 5,798,625 | 8/1998 | Tanii et al. | 318/541 |
| 5,920,139 | 6/1999 | Fujiwara et al. | 310/154 |

*Primary Examiner*—Nestor Ramirez
*Assistant Examiner*—Joseph Waks
*Attorney, Agent, or Firm*—Nikaido, Marmelstein, Murray & Oram LLP

[57] ABSTRACT

A pair of magnets (51, 52) oppositely disposed on each side of a rotor 1 are respectively magnetised such that the surface of each magnet facing the rotor 1 includes the North and South poles in a predetermined proportion. When no electric current is supplied to the coil, the rotor (1) rests at a magnetically stable position where the rotor 1 is inclined by a displacement angle $\alpha$ relative to the vertical axis Y of the two-pole motor. A pair of commutators (31, 32) are mounted on a shaft (4) of the rotor (1) as displaced in a rotation direction by a displacement angle ($\beta$) relative to the longitudinal axis (y) of the rotor (1), such that the commutators (31, 32) remain in contact with the fixed brushes (61, 62) in the static state of the rotor (1). The surface of each magnet facing the rotor (1) is magnetised to include an unlike pole in a proportion of 15 to 20%. The displacement angle $\alpha$ and the displacement angle $\beta$ are related by $\alpha < \beta < 45°$.

4 Claims, 5 Drawing Sheets

TWO-POLE MOTOR

FIELD OF THE INVENTION

The present invention relates to a two-pole motor, and particularly a two-pole motor having an autostart function.

DESCRIPTION OF THE PRIOR ART

FIG. 9 is a schematic persoective view of a conventional two-pole motor. In a general two-pole motor, a rotor 10 is equipped with a coil 11 and a pair of commutators 131, 132 connected to the coil 11, and the rotor 10 is rotatably disposed within the magnetic field (from the North pole to the South pole) produced by magnets 151, 152. Electric currents are sent from the commutators 131, 132 which are in contact with a pair of fixed brushes 141, 142 disposed on each side thereof.

There are also provided bearings 161, 162 for rotatably supporting a shaft 12 of the rotor 10, and a coil cover 17 which covers the coil 11 with exposing the coil ends 111, 112.

As shown in FIG. 10, a pair of commutators 131, 132 of half-split cylindrical configuration are connected to an end of the winding of the coil 11, and mounted on the shaft 12 of the rotor 10 in an opposite relationship to each other in the axial direction of the coil 11. The commutators 131, 132 rotate along with the shaft 12 and alternately contact the right and left fixed brushes 141, 142. According to the change of the direction of the electric current in the coil 11, the ends 111, 112 of the coil 11 are excited to have the North and South poles alternately, thereby generating a repellent force and an attracting force with respect to the magnets 151, 152. The shaft 12 is rotated by these magnetic forces.

The direction of the electric current supplied to the coil 11 is switched when the coil 11 is at a horizontal position, i.e. where the coil 11 is subjected to the maximum magnetic force of the magnets 151, 152. In this state, both of the commutators 131, 132 are out of contact with the fixed brushes 141, 142, whereby the current supply to the coil 11 stops temporarily. Nevertheless, the rotor 10 can continue to rotate owing to the force of inertia insofar as the rotor 10 has been rotating.

When the motor stops, however, the coil rests at the magnetically stable horizontal position under the influence of the magnetic attracting force. Since the commutators are kept out of contact with the fixed brushes, it is impossible to transmit the electric current from the fixed brushes to the coil and subsequently to start the motor. The motor cannot start unless the motor shaft is pushed in either direction.

Some prior art technologies suggest a solution to this problem, including Japanese Utility Model Publication No. 26064/1994 (JP-Y-6-26064), Japanese Utility Model Laid-open No. 66568/1991 (JP-U-3-66568) and Japanese Utility Model No. 3011243. In these disclosures, a metal piece of a predetermined shape is attached to the rotor for the purpose of magnetically stabilising and stopping the coil at an inclined position, where the commutators remain in contact with the fixed brushes to transmit the electric current. In order to provide this metal piece, however, these technologies require an additional component, an additional assembly step therefor and a higher production cost.

SUMMARY OF THE INVENTION

The first object of the present invention is to provide a two-pole motor which is capable of starting automatically without the aid of any additional components, and which can be manufactured by a simple process at a low production cost.

The second object of the invention is to provide a two-pole motor which has a highest possible driving efficiency.

In view of the above objects, the present invention provides a two-pole motor comprising a pair of oppositely disposed magnets, a rotor rotatably disposed between the magnets and equipped with a two-pole coil and a pair of commutators connected to the coil, each end of the coil being excited to have the North and South poles alternately, and a pair of fixed brushes provided such that the commutators rotate in contact with the fixed brushes and send an electric current. In this two-pole motor, a surface of each magnet facing the rotor is magnetised in unlike polarity to include the North and South poles in such a predetermined proportion that, when no electric current is supplied to the coil, the rotor rests at a magnetically stable position as inclined by a displacement angle $\alpha$ relative to the vertical axis of the two-pole motor. Besides, the commutators are mounted on a shaft of the rotor as displaced in a rotation direction by a displacement angle $\beta$ so as to keep in contact with the fixed brushes in the static state of the rotor.

In a preferable embodiment, the surface of each magnet facing the rotor includes an unlike pole in a proportion of 15 to 20%.

In another preferable embodiment, the displacement angle $\alpha$ and the displacement angle $\beta$ are related by $\alpha < \beta < 45°$.

Alternatively, each of the magnets may be divided into an inner portion facing the rotor and an outer portion, the adjoining portions of the magnets having an unlike pole to each other.

In the two-pole motor of the above structure, a pair of magnets disposed on each side of the coil are magnetised in unlike polarity in a predetermined proportion. Hence, the rotor rotatably disposed within the magnetic field generated by these magnets rests at a magnetically stable inclined position. When the rotor is static and inclined, the commutators are displaced in a rotation direction by a greater angle (displacement angle $\beta$) than the inclination of the rotor (displacement angle $\alpha$). Since the commutators remain in contact with the fixed brushes, the electric current supplied to the fixed brushes is transmitted through the commutators to the coil. The electric current excites one end of the coil to have the North pole and the other end to have the South pole, whereby a repellent force is generated with respect to the neighbouring portions of the magnets. On the other hand, an attracting force is generated owing to the specific magnetic pattern (e.g. the bottom portion of one magnet comprises the South pole, and the top portion of the other magnet comprises the North pole). The counterclockwise attracting force propels the rotor equipped with the coil to rotate in the same direction. The autostart function is thus imparted to the two-pole motor of the present invention.

DETAILED DESCRIPTION OF THE PREFERRED EMBODIMENTS

Referring now to the attached drawings, the present invention is described in detail.

Figure 1:
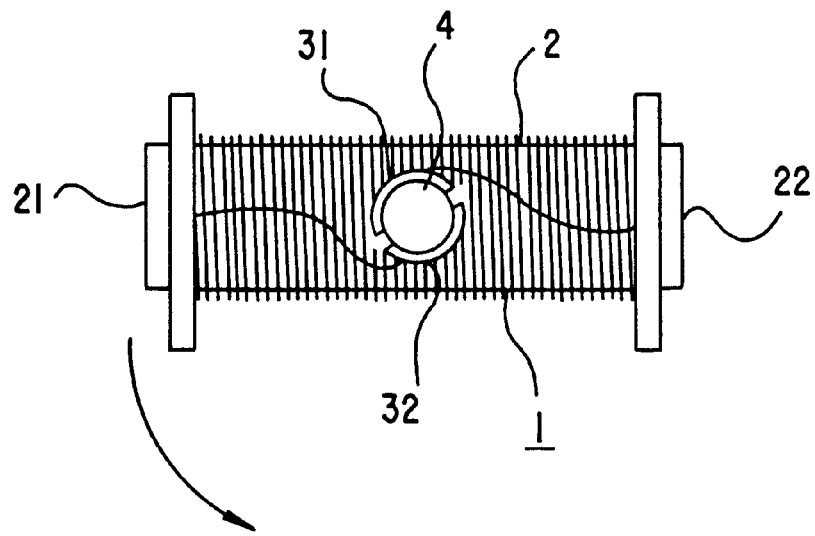
FIG. 1 is a front view showing a rotor used in the two-pole motor of the present invention.
Figure 2:
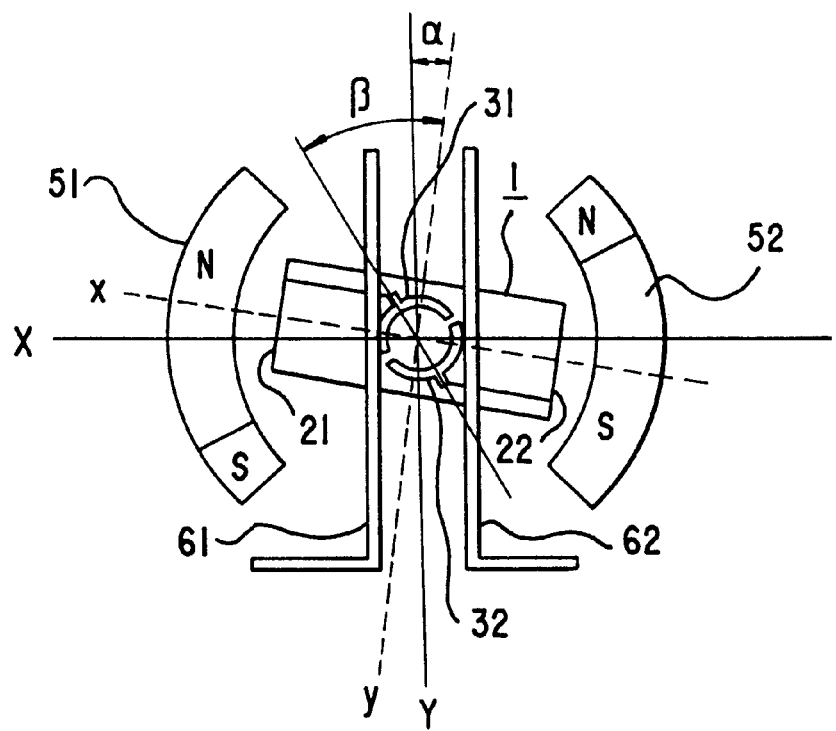
FIG. 2 is a view showing the structure of the two-pole motor according to one embodiment of the present invention.

FIG. 1 is a front view showing a rotor 1 used in a two-pole motor of the present invention, and FIG. 2 shows a structure of the two-pole motor using the rotor 1.

The illustrated two-pole motor is similar in the structure to conventional two-pole motors. The two-pole motor comprises a rotor 1 equipped with a two-pole coil 2 and a pair of commutators 31, 32 each connected to the coil 2 and mounted on a shaft 4, a pair of magnets 51, 52 disposed on each side of the rotor 1 to permit the rotation thereof, and a pair of fixed brushes 61, 62 arranged in contact with the commutators 31, 32 on each side thereof.

In the two-pole motor of the present invention, the magnets 51, 52 disposed on each side of the rotor 1 are magnetised to have unlike poles in a predetermined proportion. Specifically, the magnet 51 disposed on the left side of the rotor 1 is mostly comprised of the North pole, with only the bottom end portion being composed of the South pole. On the other hand, the magnet 52 disposed on the right side of the rotor 1 is mostly comprised of the South pole, with only the top end portion being composed of the North pole.

Preferably, the proportion of an unlike pole 51a, 52a is 15 to 20% of the magnet. It should be noted that the unlike pole in the magnet 51 is opposite to the one in the magnet 52. In other words, the proportions of one magnetic pole to the other are reversed between the magnets 51, 52.

The rotor 1 is rotatably arranged in the magnetic field generated by the magnets 51, 52. When the coil 2 is not energised, the rotor 1 stays at a magnetically stable position, as shown in FIG. 2, where the rotor 1 is inclined by a displacement angle α with respect to the vertical axis Y of the motor. A pair of commutators 31, 32 are of half-split cylindrical configuration and mounted on the shaft 4 of the rotor 1. More precisely, the commutators 31, 32 are oppositely mounted on the shaft 4 and insulated from each other, wherein they are forwardly displaced in a rotation direction (the left rotation direction in FIG. 2) by a predetermined angle (displacement angle β in FIG. 2) with respect to the longitudinal axis y (to the plane of the figure) of the rotor 1.

For reliable activation of the motor, the displacement angle β is preferably greater than the displacement angle α and less than 45°.

Figure 3:
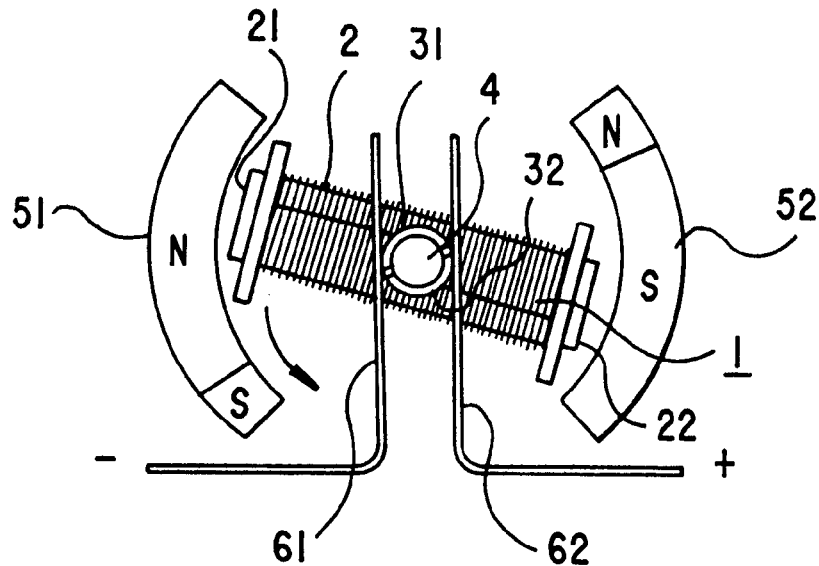
FIG. 3 is a view showing the two-pole motor of the invention in a static state.
Figure 4:
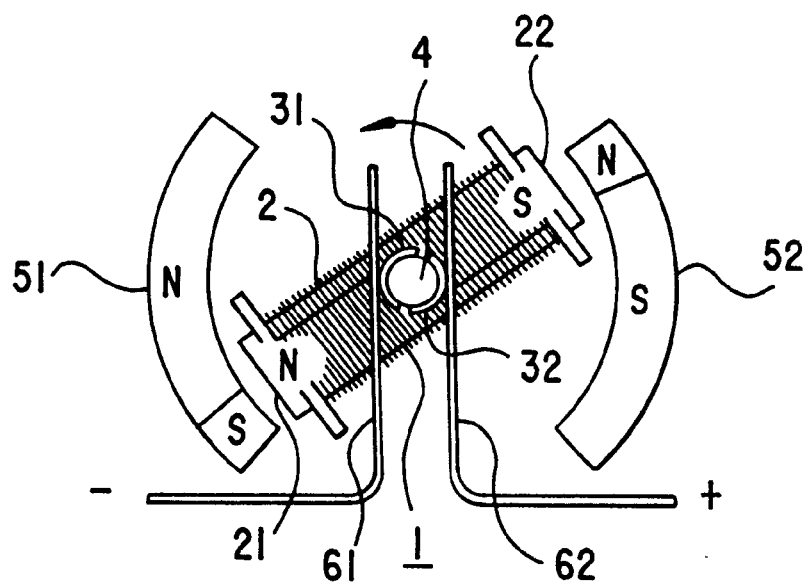
FIG. 4 is a view showing the two-pole motor of the invention just after the start of the electric current supply.
Figure 5:
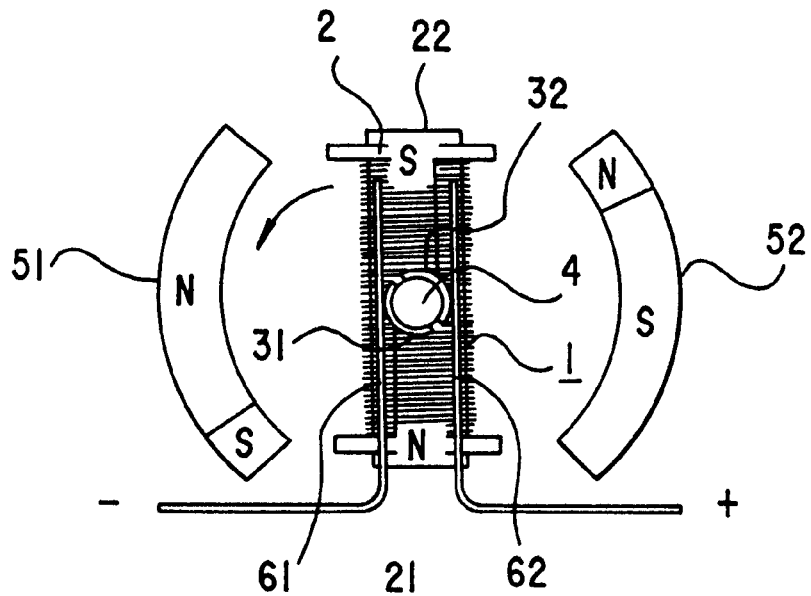
FIG. 5 is a view showing the two-pole motor of the invention just before the direction of the electric current supply to the coil is switched.
Figure 6:
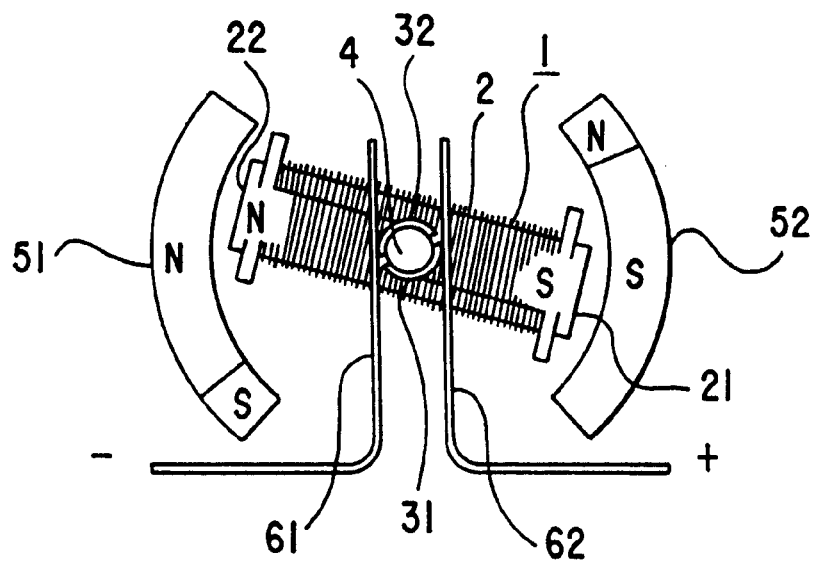
FIG. 6 is a view showing the two-pole motor of the invention just after the direction of the electric current supply to the coil is switched.

The operation of the two-pole motor of the above structure is explained with reference to FIGS. 3 to 6 in which: FIG. 3 is a view showing the two-pole motor of the invention in a static state; FIG. 4 is a view showing the two-pole motor of the invent on just after the start of the electric current supply; FIG. 5 is a view showing the two-pole motor of the invention just before the direction of the electric current supply to the coil is switched; and FIG. 6 is a view showing the two-pole motor of the invention just after the direction of the electric current supply is switched.

As shown in FIG. 3, the magnets 51, 52 disposed on each side of the coil 2 are respectively magnetised to include an unlike pole in a predetermined proportion (herein, the "unlike pole" indicates the South pole in the magnet 51, and the North pole in the magnet 52). The rotor 1 rotatably disposed within the magnetic field of the magnets 51, 52 is magnetically stabilised and remains stationary at an inclined position shown in FIG. 3. In this static state, the commutators 31, 32, which are oppositely mounted on the shaft 4 and insulated from each other, are displaced in a rotation direction by a greater angle (displacement angle β) than the inclination of the rotor 1 (displacement angle α). Hence, the commutators 31, 32 are in contact with the fixed brushes 61, 62, respectively. When the electric current is applied to the fixed brushes 61, 62, the current flows through the commutators 31, 32 into the coil 2 and excites the ends 21, 22 of the coil 2 to have the North pole and the South pole, respectively. Consequently, the excited coil ends 21, 22 repel against the neighbouring magnets 51, 52. In the meantime, the coil ends 21, 22 are attracted to the South pole at the bottom end portion of the left magnet 51 and the North pole at the top end portion of the magnet 52, respectively. This counterclockwise attracting force propels the rotor 1 equipped with the coil 2 to rotate in the same direction.

The attracting force between the magnets 51, 52 and the coil 2 is maximum at the position shown in FIG. 4. Beyond this point, the rotational inertia brings the rotor 1 to the position shown in FIG. 5. In fact, such rotation may be partly assisted by the repellent force between the coil ends 21, 22 and the principal magnetic poles in the magnets 51, 52 (i.e. the North pole in the magnet 51, and the South pole in the magnet 52).

At the position shown in FIG. 5, the top end of the coil 2 having the South pole is attracted to the North pole in the left magnet 51, while the bottom end thereof having the North pole is attracted to the South pole in the right magnet 52. The attracting force propels the rotor 1 to rotate further in the counterclockwise direction. Following this rotation, the commutator 32 switches its contact from the right fixed brush 62 to the left fixed brush 61, and the commutator 31 switches its contact from the left fixed brush 61 to the right fixed brush 62. As a result, the direction of the electric current supplied to the coil 2 is switched to reverse the polarity of the coil 2. As specifically shown in FIG. 6, the South-pole end of the coil 2 is turned into the North pole and the North-pole end is turned into the South pole. The polarity-reversed coil 2 is rotated by the repellent force against the neighbouring magnets 51, 52.

The two-pole motor of the present invention rotates continuously by repeating the above actions.

When the supply of the electric current stops, the rotor 1 rests at an inclined position shown in FIG. 3, where the rotor 1 is magnetically stabilised in the magnetic field generated by the magnets 51, 52 each including an unlike pole. Since the commutators 31, 32 remain in contact with the fixed brushes 61, 62, as shown in FIG. 3, the rotor 1 automatically starts to rotate on energisation, according to the above principle.

As has been described, the two-pole motor of the present invention automatically starts to rotate on energisation and continuously rotates in the same manner as conventional two-pole motors.

Figure 7:
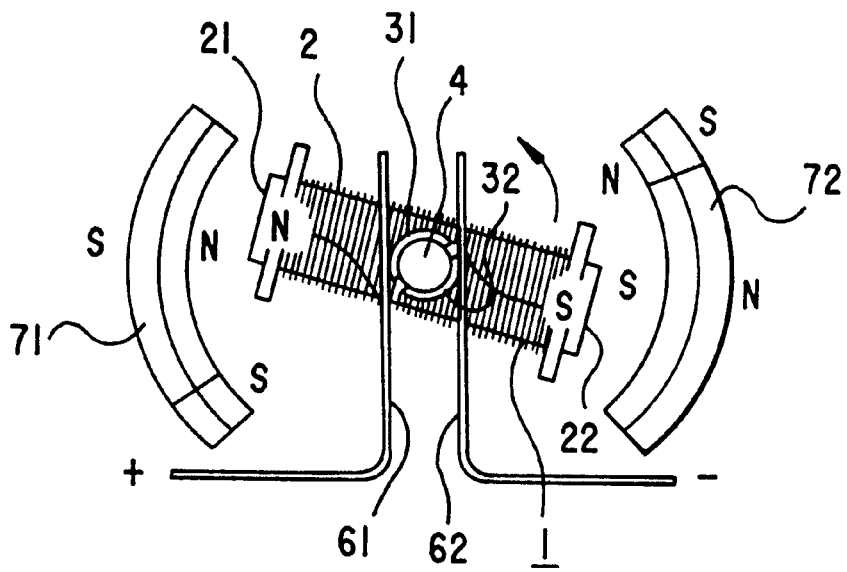
FIG. 7 is a schematic front view showing another embodiment of the present invention.

In the above embodiment of the two-pole motor of the invention, the unlike pole is provided exclusively at one end portion of the magnets 51, 52. Alternatively, various magnet patterns can be applied as far as the surface facing the rotor 1 satisfies a predetermined proportion of magnetic polarity. As shown in FIG. 7, the magnets 71, 72 may be divided into inner and outer portions of unlike polarity.

Figure 8:
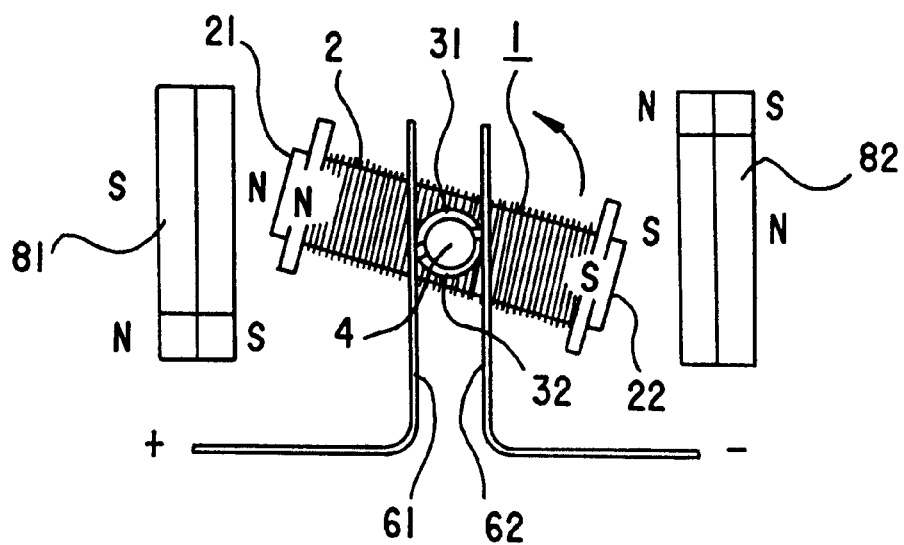
FIG. 8 is a schematic front view showing a still another embodiment of the present invention.
Figure 9:
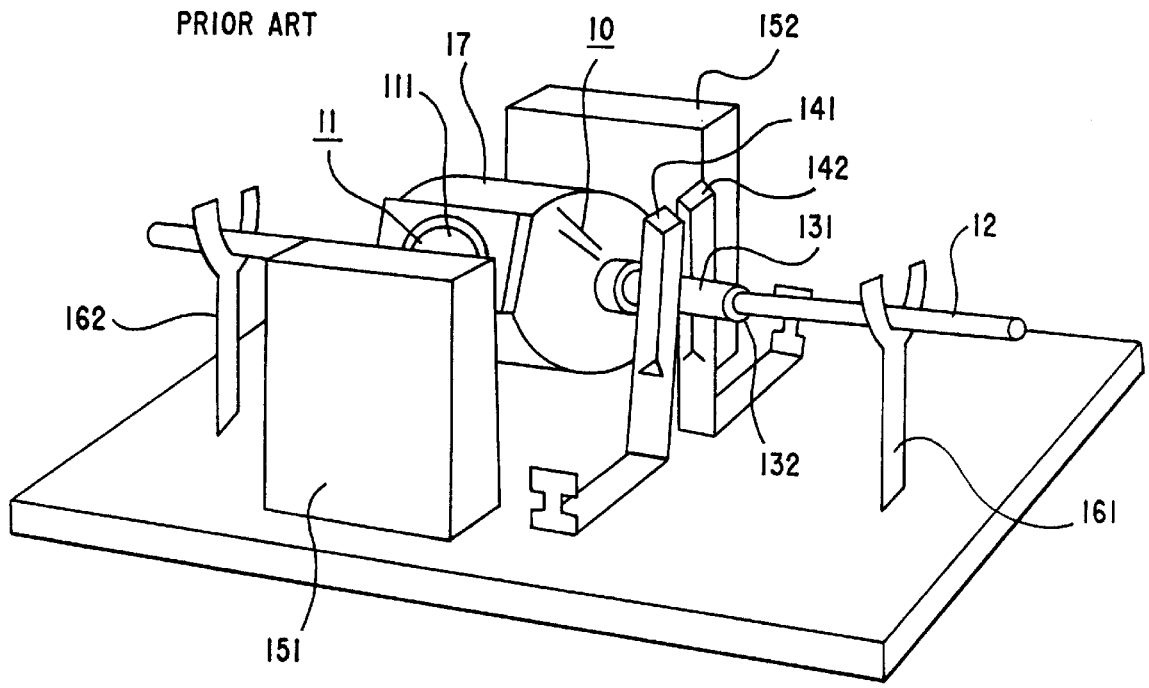
FIG. 9 is a schematic perspective view of a conventional two-pole motor.
Figure 10:
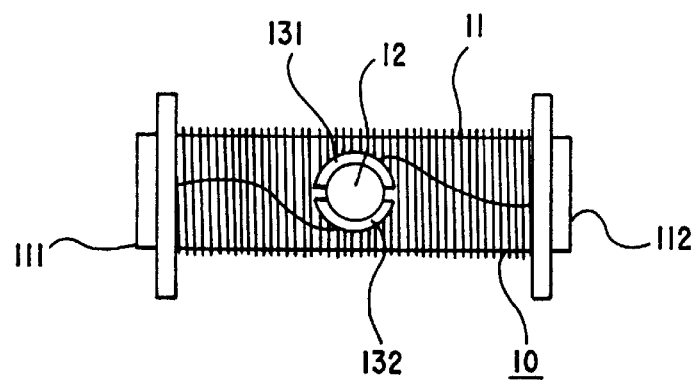
FIG. 10 is a front view showing a rotor used in a conventional two-pole motor.

In another aspect, the magnets 51, 52, disposed on both sides of the rotor 1 in the above embodiment, have an arc-like configuration. Magnets of other configurations, such as bar- or plate-like magnets 81, 82 shown in FIG. 8, can be similarly utilised as far as a magnetic field is generated around the rotor 1.

What is claimed is:

1. A two-pole motor comprising a pair of oppositely disposed magnets, a rotor rotatably disposed between the magnets and equipped with a two-pole coil and a pair of commutators connected to the coil, each end of the coil being excited to have the North and South poles alternately, and a pair of fixed brushes provided such that the commutators rotate in contact with the fixed brushes and send an electric current, wherein a surface of each of said magnets facing the rotor is magnetised in an unlike polarity to include the North and South poles in such a predetermined proportion that, when no electric current is supplied to the coil, the rotor rests at a magnetically stable position as inclined by a displacement angle $\alpha$ relative to a vertical axis of the two-pole motor, and wherein the commutators are mounted on a shaft of the rotor as displaced in a rotation direction by a displacement angle $\beta$ so as to keep in contact with the fixed brushes in a static state of the rotor.

2. A two-pole motor as claimed in claim 1, wherein the surface of each of said magnets facing the rotor includes an unlike pole in a proportion of 15 to 20% of the surface of said each magnet.

3. A two-pole motor as claimed in claim 1, wherein the displacement angle $\alpha$ and the displacement angle $\beta$ are related by $\alpha<\beta<45°$.

4. A two-pole motor as claimed in any of claims 1, 2 and 3, wherein each of the magnets is divided into an inner portion facing the rotor and an outer portion, adjoining portions of the magnets having an unlike pole to each other.

* * * * *